(12) United States Patent
Terabe et al.

(10) Patent No.: US 8,184,729 B2
(45) Date of Patent: May 22, 2012

(54) COMMUNICATION PROCESSING SYSTEM, OFDM SIGNAL TRANSMITTING METHOD, OFDM TRANSMITTER, OFDM RECEIVER, AND CONTROL STATION

(75) Inventors: Shigeo Terabe, Tokyo (JP); Koji Akita, Kanagawa-Ken (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 586 days.

(21) Appl. No.: 12/479,985

(22) Filed: Jun. 8, 2009

(65) Prior Publication Data
US 2010/0119003 A1    May 13, 2010

(30) Foreign Application Priority Data
Nov. 10, 2008 (JP) ............................... P2008-288180

(51) Int. Cl.
*H04K 1/10* (2006.01)
(52) U.S. Cl. ........ 375/260; 341/180; 370/464; 375/267; 375/299; 375/347; 455/101; 455/103

(58) Field of Classification Search ........................ None
See application file for complete search history.

(56) References Cited

FOREIGN PATENT DOCUMENTS
JP    2007-189646 A    7/2007

OTHER PUBLICATIONS
IEEE Part 16: Air Interface for Broadband Wireless Access Systems; Jun. 2008; pp. 472-475.

*Primary Examiner* — David C. Payne
*Assistant Examiner* — Adolf Dsouza
(74) *Attorney, Agent, or Firm* — Maschoff Gilmore & Israelsen

(57) ABSTRACT

In an OFDM transmitter included in a first service area, an orthogonal-code-pattern multiplication unit multiplies pilot channel signals belonging to any subcarrier group by an orthogonal code which is different from that for one or a plurality of OFDM transmitters adjacent to the OFDM transmitter included in the first service area, or a subcarrier assignment unit assigns pilot channel signals to pilot subcarriers which are common to a plurality of OFDM transmitters and based on a pilot arrangement notified in advance by a control station to all OFDM transmitters included in the first service area.

18 Claims, 10 Drawing Sheets

COMMUNICATION PROCESSING SYSTEM, OFDM SIGNAL TRANSMITTING METHOD, OFDM TRANSMITTER, OFDM RECEIVER, AND CONTROL STATION

BACKGROUND OF THE INVENTION

1. Field of the Invention

The present invention relates to communication processing systems, orthogonal frequency division multiplexing (OFDM) signal transmitting methods, OFDM transmitters, OFDM receivers, and control stations. In particular, the present invention relates to a communication processing system, an OFDM signal transmitting method, an OFDM transmitter, an OFDM receiver, and a control station capable of transmitting and receiving OFDM signals.

2. Description of the Related Art

The description herein assumes the case where OFDM is used as a radio access scheme, and multicast/broadcast communication (hereinafter referred to as "MBS communication") is performed. According to Japanese Unexamined Patent Application Publication No. 2007-189646, the description herein also assumes the case where MBS communication is performed and to which a group-wise scrambling method (group scrambling method) is applied. In particular, the description herein assumes the case where two or more pilot subcarriers are arranged in one subcarrier group.

Multicast/broadcast services (MBS) have been standardized. According to the IEEE802.16e standard, by using a cellular network, a multicast/broadcast service assigns a common physical resource to all users (i.e., mobile stations MS owned by the respective users) present in a cell area, and delivers high-quality video streaming, news information, or commercial films. In contrast, communication in which a base station assigns an individual physical resource to one mobile station MS is referred to as "unicast communication". In the case of MBS communication, the same multicast/broadcast data is transmitted from one or more base stations. A group of base stations that perform MBS communication is defined as a "multicast/broadcast service area". Generally, as compared to a broadcast service station, one base station included in a multicast/broadcast service area covers a smaller area and has a smaller cell size. Therefore, it is possible to provide location-based information services that are available only in a limited area.

It is also possible to vary the multicast/broadcast service area for each multicast/broadcast service. Since this may cause interference between multicast/broadcast services on a boundary between different multicast/broadcast service areas, it is important to suppress the effect of interference between multicast/broadcast services.

A plurality of pilot signals arranged in one subcarrier group are multiplied by the same scrambling code. Then, channel estimation is made by averaging or interpolating only the plurality of pilot signals in the subcarrier group. Therefore, if positions of pilot subcarriers are the same in adjacent multicast/broadcast service areas, interference caused by pilot signals is strengthened. As a result, it is difficult to obtain a correct channel response, and reception performance is degraded.

Specifically, as illustrated in FIG. 1, in subcarrier group #1 in a transmission signal transmitted from base station 1 belonging to multicast/broadcast service area A, two pilot subcarriers are arranged, and pilot channel signals are present as indicated by a1. In subcarrier group #1 in a transmission signal transmitted from base station 2 belonging to multicast/broadcast service area B, two pilot subcarriers are arranged at the same positions as in the case of subcarrier group #1 for base station 1, and pilot channel signals are present as indicated by b1. A channel response from base station 1 to a mobile station MS is denoted by h_a1, and a channel response from base station 2 to the mobile station MS is denoted by h_b1. A channel response estimate desired by the mobile station MS belonging to multicast/broadcast service area A and adjacent to multicast/broadcast service area B is h_a1 when the mobile station MS is assigned to subcarrier group #1. However, due to interference of pilot channel signals, the actual channel response is $a1h\_a1+b1h\_b1+n1/2+n2/2+n3/2+n4/2$. Since a1 is known to the mobile station MS, $h\_a1+b1^*(h\_b1/a1)+(n1/2+n2/2+n3/2+n4/2)/a1$ can be determined as the channel response by dividing $a1h\_a1+b1h\_b1+n1/2+n2/2+n3/2+n4/2$ by a1. Here, $n^*/2$ denotes a noise component, which can be ignored if SNR is high enough. If the mobile station MS is located near multicast/broadcast service area B, since signal power of b1 is large, the second term of the above expression is large. As a result, the quality of a channel response is degraded. The same applies to subcarrier groups #2 and #3.

SUMMARY OF THE INVENTION

The present invention has been made in view of the circumstances described above. An object of the present invention is to provide a communication processing system, an OFDM signal transmitting method, an OFDM transmitter, an OFDM receiver, and a control station in which, even if a group scrambling method is used, it is possible to suppress interference of pilot channel signals in multicast/broadcast service communication, and achieve accurate channel estimation on a boundary between different multicast/broadcast service areas.

In order to attain the above-mentioned object, according to an aspect of the present invention, there is provided a communication processing system comprising: an OFDM transmitter; and a control station configured to provide a service area including a plurality of OFDM transmitters, wherein, for every OFDM transmitter included in the same service area, the control station determines time symbols of data to which macro diversity reception is applied, and determines at least one of an orthogonal code by which pilot channel signals are multiplied in transmission of the data in every OFDM transmitter included in the same service area and a pilot arrangement of the pilot channel signals; the control station transmits, to all the OFDM transmitters included in the same service area, time symbol information about the determined time symbols, and at least one of the orthogonal code and the pilot arrangement; and each of the OFDM transmitters included in the same service area receives the time symbol information from the control station, receives at least one of the orthogonal code and the pilot arrangement from the control station, performs, on the basis of at least one of the orthogonal code and the pilot arrangement from the control station, at least one of a multiplication using the orthogonal code and an assignment of the pilot channel signals to subcarriers on the basis of the pilot arrangement, sets a subcarrier group, generates an OFDM signal according to time symbols based on the time symbol information, and transmits the generated OFDM signal to an OFDM receiver.

In order to attain the above-mentioned object, according to another aspect of the present invention, there is provided an OFDM signal transmitting method of an OFDM transmitter included in a first service area, the OFDM signal transmitting method comprising: a data channel signal generating step of generating data channel signals including at least one of a first data channel signal and a second data channel signal by modulating a bit string obtained by channel coding; a pilot channel signal generating step of generating pilot channel signals; an assigning step of assigning the data channel signals generated in the data channel signal generating step to data subcarriers common to a plurality of OFDM transmitters, and assigning the pilot channel signals generated in the pilot channel signal generating step to pilot subcarriers common to the plurality of OFDM transmitters; a subcarrier group setting step of setting at least one subcarrier group including a first pilot subcarrier, a second pilot subcarrier multiplied by the same scrambling code as that by which the first pilot subcarrier is multiplied, and one or a plurality of data subcarriers close to the first pilot subcarrier and the second pilot subcarrier in terms of time and frequency and multiplied bay the same scrambling code as that by which the first pilot subcarrier and the second pilot subcarrier are multiplied; an orthogonal code multiplication step of multiplying, of the pilot channel signals generated in the pilot channel signal generating step, pilot channel signals belonging to any subcarrier group set in the subcarrier group setting step by an orthogonal code which differs between the first service area and one or a plurality of other service areas adjacent to the OFDM transmitter included in the first service area; a scrambling step of multiplying, of the data channel signals, a first data channel signal for which a subcarrier group is set in the subcarrier group setting step and the pilot channel signals multiplied by the orthogonal code in the orthogonal code multiplication step by a scrambling code common to a plurality of OFDM transmitters in which the same subcarrier group is set, and multiplying, of the data channel signals, a second data channel signal for which a subcarrier group is not set in the subcarrier group setting step by a predetermined scrambling code orthogonal or near-orthogonal among the OFDM transmitters and unique to each OFDM transmitter; a complex number multiplication step of multiplying the pilot channel signals and the first data channel signal by a complex number for each subcarrier group; an OFDM signal generating step of generating, in accordance with time symbols based on time symbol information from a control station that controls a plurality of OFDM transmitters included in the first service area, an OFDM signal by OFDM-modulating the second data channel signal multiplied in the scrambling step by the predetermined scrambling code orthogonal or near-orthogonal among the OFDM transmitters and unique to each OFDM transmitter, and the pilot channel signals and the first data channel signal multiplied by the complex number in the complex number multiplication step; and a transmitting step of transmitting the OFDM signal generated in the OFDM signal generating step to an OFDM receiver via an antenna.

In order to attain the above-mentioned object, according to another aspect of the present Invention, there is provided an OFDM signal transmitting method of an OFDM transmitter included in a first service area, the OFDM signal transmitting method comprising: a data channel signal generating step of generating data channel signals including at least one of a first data channel signal and a second data channel signal by modulating a bit string obtained by channel coding; a pilot channel signal generating step of generating pilot channel signals; an assigning step of assigning the data channel signals generated in the data channel signal generating step to data subcarriers common to a plurality of OFDM transmitters, and assigning the pilot channel signals generated in the pilot channel signal generating step to pilot subcarriers common to the plurality of OFDM transmitters and based on a pilot arrangement notified in advance by a control station that controls the OFDM transmitter included in the first service area to all OFDM transmitters included in the first service area; a subcarrier group setting step of setting at least one subcarrier group including a first pilot subcarrier, a second pilot subcarrier multiplied by the same scrambling code as a scrambling code by which the first pilot subcarrier is multiplied, and one or a plurality of data subcarriers close to the first pilot subcarrier and the second pilot subcarrier in terms of time and frequency and multiplied by the same scrambling code as a scrambling code by which the first pilot subcarrier and the second pilot subcarrier are multiplied; a scrambling step of multiplying, of the data channel signals, a first data channel signal and pilot channel signals for which a subcarrier group is set in the subcarrier group setting step by a scrambling code common to a plurality of OFDM transmitters in which the same subcarrier group is set, and multiplying, of the data channel signals, a second data channel signal for which a subcarrier group is not set in the subcarrier group setting step by a predetermined scrambling code orthogonal or near-orthogonal among the OFDM transmitters and unique to each OFDM transmitter; a complex number multiplication step of multiplying the pilot channel signals and the first data channel signal by a complex number for each subcarrier group; an OFDM signal generating step of generating, in accordance with time symbols based on time symbol information from the control station, an OFDM signal by OFDM-modulating the second data channel signal multiplied in the scrambling step by the predetermined scrambling code orthogonal or near-orthogonal among the OFDM transmitters and unique to each OFDM transmitter, and the pilot channel signals and the first data channel signal multiplied by the complex number in the complex number multiplication step; and a transmitting step of transmitting the OFDM signal generated in the OFDM signal generating step to an OFDM receiver via an antenna.

In order to attain the above-mentioned object, according to another aspect of the present invention, there is provided an OFDM transmitter included in a first service area, the OFDM transmitter comprising: a data channel signal generating unit configured to generate data channel signals including at least one of a first data channel signal and a second data channel signal by modulating a bit string obtained by channel coding, a pilot channel signal generating unit configured to generate pilot channel signals; an assigning unit configured to assign the data channel signals generated by the data channel signal generating unit to data subcarriers common to a plurality of OFDM transmitters, and assign the pilot channel signals generated by the pilot channel signal generating unit to pilot subcarriers common to the plurality of OFDM transmitters; a subcarrier group setting unit configured to set at least one subcarrier group including a first pilot subcarrier, a second pilot subcarrier multiplied by the same scrambling code as a scrambling code by which the first pilot subcarrier is multiplied, and one or a plurality of data subcarriers close to the first pilot subcarrier and the second pilot subcarrier in terms of time and frequency and multiplied by the same scrambling code as a scrambling code by which the first pilot subcarrier and the second pilot subcarrier are multiplied; an orthogonal code multiplication unit configured to multiply, of the pilot channel signals generated by the pilot channel signal generating unit, pilot channel signals belonging to any subcarrier group set by the subcarrier group setting unit by an orthogonal code that differs between the first service area and one or a plurality of other service areas adjacent to the OFDM transmitter included in the first service area; a scrambling unit configured to multiply, of the data channel signals, a first data channel signal for which a subcarrier group is set by the subcarrier group setting unit and the pilot channel signals multiplied by the orthogonal code by the orthogonal code multiplication unit by a scrambling code common to a plurality of OFDM transmitters in which the same subcarrier group is set, and multiply, of the data channel signals, a second data channel signal for which a subcarrier group is not set by the subcarrier group setting unit by a predetermined scrambling code orthogonal or near-orthogonal among the OFDM transmitters and unique to each OFDM transmitter; a complex number multiplication unit configured to multiply the pilot channel signals and the first data channel signal by a complex number for each subcarrier group; an OFDM signal generating unit configured to generate, in accordance with time symbols based on time symbol information from a control station that controls a plurality of OFDM transmitters included in the first service area, an OFDM signal by OFDM-modulating the second data channel signal multiplied by the scrambling unit by the predetermined scrambling code orthogonal or near-orthogonal among the OFDM transmitters and unique to each OFDM transmitter, and the pilot channel signals and the first data channel signal multiplied by the complex number by the complex number multiplication unit; and a transmitting unit configured to transmit the OFDM signal generated by the OFDM signal generating unit to an OFDM receiver via an antenna.

In order to attain the above-mentioned object, according to another aspect of the present invention, there is provided an OFDM transmitter included in a first service area, the OFDM transmitter comprising: a data channel signal generating unit configured to generate data channel signals including at least one of a first data channel signal and a second data channel signal by modulating a bit string obtained by channel coding; a pilot channel signal generating unit configured to generate pilot channel signals; an assigning unit configured to assign the data channel signals generated by the data channel signal generating unit to data subcarriers common to a plurality of OFDM transmitters, and assign the pilot channel signals generated by the pilot channel signal generating unit to pilot subcarriers common to the plurality of OFDM transmitters and based on a pilot arrangement notified in advance by a control station that controls the OFDM transmitter included in the first service area to all OFDM transmitters included in the first service area; a subcarrier group setting unit configured to set at least one subcarrier group including a first pilot subcarrier, a second pilot subcarrier multiplied by the same scrambling code as a scrambling code by which the first pilot subcarrier is multiplied, and one or a plurality of data subcarriers close to the first pilot subcarrier and the second pilot subcarrier in terms of time and frequency and multiplied by the same scrambling code as a scrambling code by which the first pilot subcarrier and the second pilot subcarrier are multiplied; a scrambling unit configured to multiply, of the data channel signals, a first data channel signal and pilot channel signals for which a subcarrier group is set by the subcarrier group setting unit by a scrambling code common to a plurality of OFDM transmitters in which the same subcarrier group is set, and multiply, of the data channel signals, a second data channel signal for which a subcarrier group is not set by the subcarrier group setting unit by a predetermined scrambling code orthogonal or near-orthogonal among the OFDM transmitters and unique to each OFDM transmitter; a complex number multiplication unit configured to multiply the pilot channel signals and the first data channel signal by a complex number for each subcarrier group; an OFDM signal generating unit configured to generate, in accordance with time symbols based on time symbol information from the control station, an OFDM signal by OFDM-modulating the second data channel signal multiplied by the scrambling unit by the predetermined scrambling code orthogonal or near-orthogonal among the OFDM transmitters and unique to each OFDM transmitter, and the pilot channel signals and the first data channel signal multiplied by the complex number by the complex number multiplication unit; and a transmitting unit configured to transmit the OFDM signal generated by the OFDM signal generating unit to an OFDM receiver via an antenna.

In order to attain the above-mentioned object, according to another aspect of the present invention, there is provided an OFDM receiver comprising a receiving unit configured to receive an OFDM signal transmitted from an OFDM transmitter included in a first service area; an OFDM demodulation unit configured to OFDM-demodulate the OFDM signal received by the receiving unit into signals for respective subcarriers; a separating unit configured to separate, from the signals obtained by the OFDM demodulation unit, pilot channel signals and data channel signals assigned to the respective subcarriers; a descrambling unit configured to descramble the data channel signals separated by the separating unit with a scrambling code common to a plurality of OFDM transmitters in which the same subcarrier group is set or with a scrambling code unique to each OFDM transmitter; an orthogonal code multiplication unit configured to multiply the pilot channel signals separated by the separating unit by an orthogonal code that differs between the first service area and one or a plurality of other service areas adjacent to the OFDM transmitter included in the first service area; a channel estimation unit configured to perform, on the basis of the pilot channel signals multiplied by the orthogonal code by the orthogonal code multiplication unit, channel estimation on the data channel signals separated by the separating unit; an equalizing unit configured to equalize, by using channel estimates obtained by the channel estimation unit, the data channel signals descrambled by the descrambling unit; and a data demodulating unit configured to demodulate the data channel signals equalized by the equalizing unit.

In order to attain the above-mentioned object, according to another aspect of the present invention, there is provided an OFDM receiver comprising: a receiving unit configured to receive an OFDM signal transmitted from an OFDM transmitter included in a first service area; an OFDM demodulation unit configured to OFDM-demodulate the OFDM signal received by the receiving unit into signals for respective subcarriers; a separating unit configured to separate, from the signals obtained by the OFDM demodulation unit, pilot channel signals assigned to pilot subcarriers based on a pilot arrangement notified in advance by a control station which controls the OFDM transmitter included in the first service area to all OFDM transmitters included in the first service area, and data channel signals assigned to their corresponding subcarriers; a descrambling unit configured to descramble the data channel signals separated by the separating unit with a scrambling code common to a plurality of OFDM transmitters in which the same subcarrier group is set or with a scrambling code unique to each OFDM transmitter; a channel estimation unit configured to perform, on the basis of the pilot channel signals separated by the separating unit, channel estimation on the data channel signals separated by the separating unit; an equalizing unit configured to equalize, by using a channel estimate obtained by the channel estimation unit, the data channel signals descrambled by the descrambling unit; and a data demodulating unit configured to demodulate the data channel signals equalized by the equalizing unit.

In order to attain the above-mentioned object, according to another aspect of the present invention, there is provided a control station that provides a service area including a plurality of OFDM transmitters, the control station comprising: a determining unit configured to determine, for every OFDM transmitter included in the same service area, time symbols of data to which macro diversity reception is applied, and at least one of an orthogonal code by which pilot channel signals are multiplied in transmission of the data in every OFDM transmitter included in the same service area and a pilot arrangement of the pilot channel signals; and a transmitting unit configured to transmit, to all the OFDM transmitters included in the same service area, information about the time symbols determined by the determining unit and at least one of the orthogonal code and the pilot arrangement.

According to an embodiment of the present invention, even when a group scrambling method is used, it is possible to suppress interference of pilot channel signals in multicast/broadcast service communication, and improve accuracy in channel estimation on a boundary between different multicast/broadcast service areas.

DESCRIPTION OF THE PREFERRED EMBODIMENTS

Hereinafter, embodiments of the present invention will be described with reference to the drawings. Before explanation of the embodiments of the present invention, a concept of the present invention will be described. In the present invention, interference of pilot channel signals from adjacent multicast/broadcast service areas is orthogonalized or randomized by one of, or a combination of the following two methods. In a first method, pilot channel signals in a subcarrier group are multiplied by a different orthogonal code for each of adjacent multicast/broadcast service areas. In a second method, positions of pilot subcarriers are changed for each of adjacent multicast/broadcast service areas.

The first method will now be described with reference to FIG. 2A to FIG. 2D. The term "orthogonal" refers to the state where a correlation between values is zero. Generally, it is possible to generate a sequence of up to k complex numbers orthogonal to each other, where k denotes a sequence length. FIG. 2A to FIG. 2D illustrate the case where multicast/broadcast service areas A, B, C, and D are adjacent to each other. A channel response estimate of a mobile station MS serving as an OFDM receiver, located in a cell area of base station 1 belonging to multicast/broadcast service area A, and located near base stations 2, 3, and 4 belonging to multicast/broadcast service areas B, C, and D, respectively, can be expressed as follows Channel response estimate=$(ha^*(a1+a1+a1+a1)+ hb^*(b1+b1\exp(\pi/2^*j)-b1+b1\exp(3\pi/2^*j))+ hc(c1-c1+c1-c1)+hd(d1+(d1\exp(3\pi/2^*j)-d1+ d1\exp(sw\pi/2^*j)))/4$ where $\pi$ denotes the ratio of the circumference of a circle to its diameter.

Here, orthogonal codes by which multicast/broadcast service areas A, B, C, and D are multiplied are as follows:

Orthogonal code for multicast/broadcast service area A=(1,1,1,1);

Orthogonal code for multicast/broadcast service area B=$(1,\exp(\pi/2^*j),-1,\exp(3\pi/2^*j))$;

Orthogonal code for multicast/broadcast service area C=(1,−1,1,−1); and

Orthogonal code for multicast/broadcast service area D=$(1,\exp(3\pi/2^*j),-1,\exp(\pi/2^*j))$.

Channel responses of propagation paths from base stations 1, 2, 3, and 4 serving as OFDM transmitters are assumed to be ha, hb, hc, and hd, respectively. A noise component is assumed to be small enough to be ignored relative to a signal component. If a channel is assumed to be flat in a subcarrier group, the channel response estimate described above is a1ha. Since a1 is known to the mobile station MS, the channel response ha from desired base station 1 can be determined by dividing a1ha by a1. Thus, pilot signal components from the other multicast/broadcast service areas can be completely cancelled.

Figure 1:
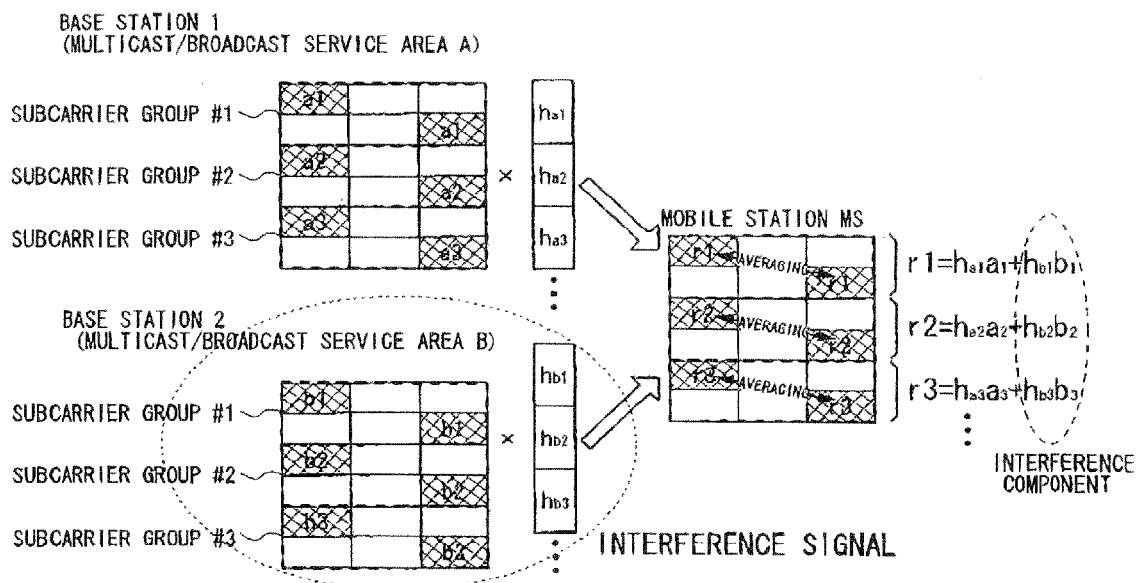
FIG. 1 illustrates the effect of interference caused by pilot signals from adjacent multicast/broadcast service areas.
Figures 2A, 2B, 2C, 2D:
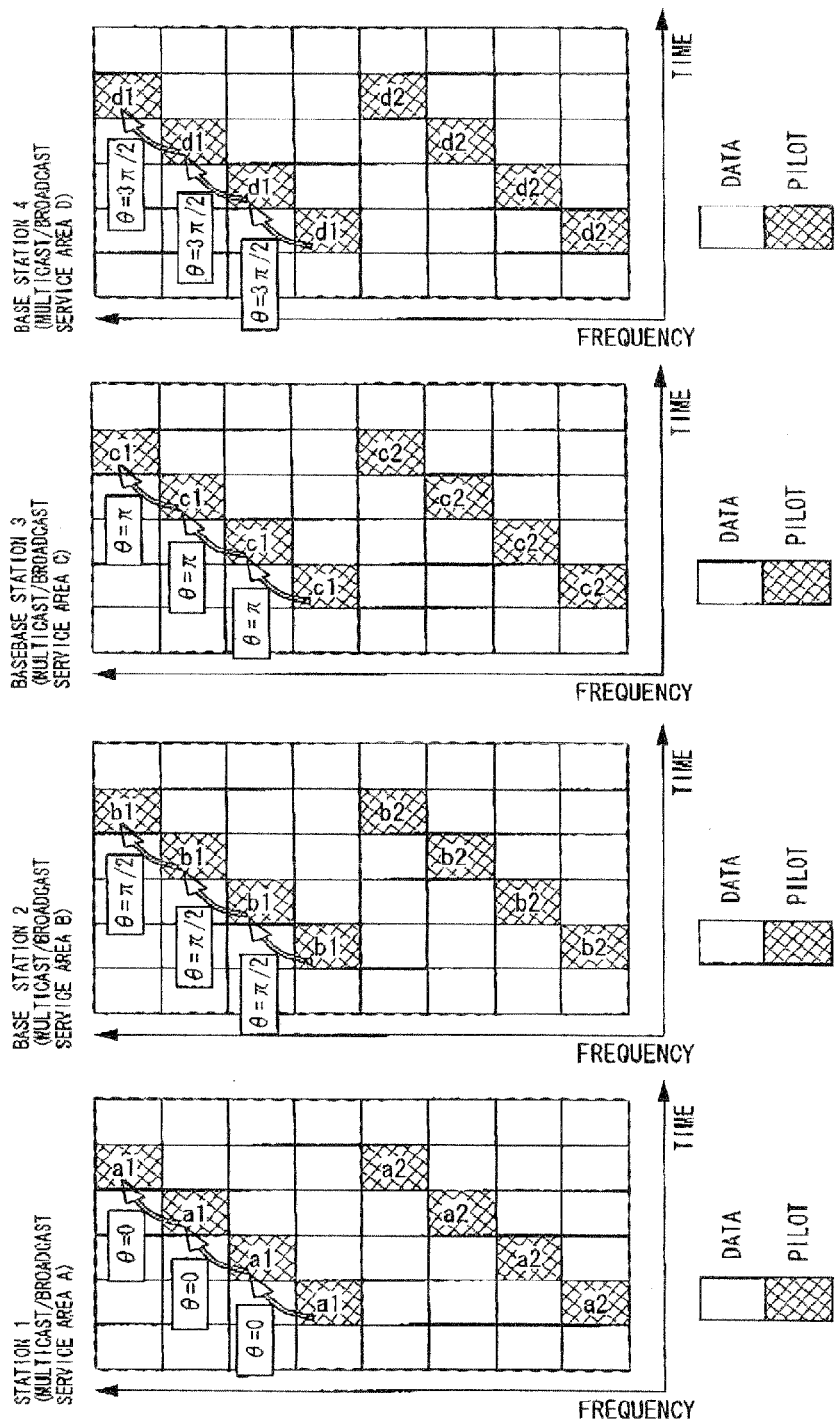
FIG. 2A to FIG. 2D illustrate a method in which pilot channel signals in a subcarrier group are multiplied by a different orthogonal code for each of adjacent multicast/broadcast service areas.
Figure 3A:
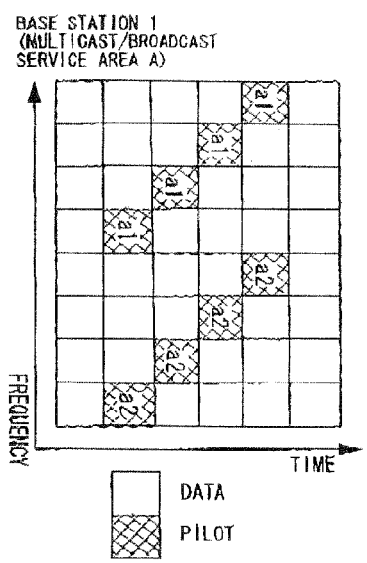
FIG. 3A to FIG. 3C illustrate a method in which positions of pilot subcarriers are changed for each of adjacent multicast/broadcast service areas.
Figure 3B:
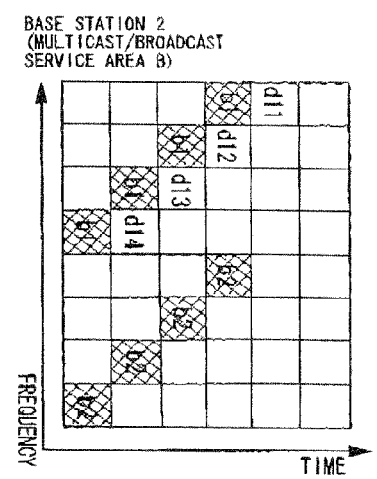
Figure 3C:
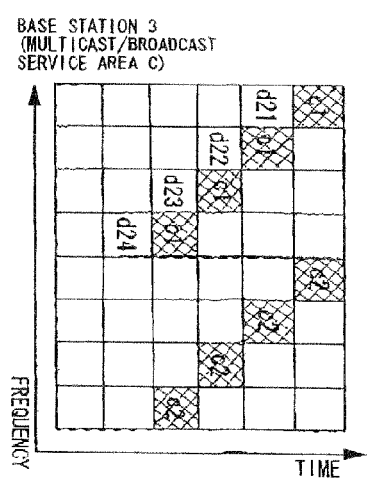

The second method will now be described with reference to FIG. 3A to FIG. 3C. The case where multicast/broadcast service areas A, B, C, and D are adjacent to each other will be described as an example. A channel response estimate of a mobile station MS serving as an OFDM receiver, located in a cell area of base station 1 belonging to multicast/broadcast service area A, and located near base stations 2 and 3 belonging to multicast/broadcast service areas B and C, respectively, can be expressed as follows:

Channel response estimate=$haa1+hb(d11+d12+d13+ d14)/4+hc(d21+d22+d23+d24)/4$ where d1* and d2* denote data channel signals arranged in data subcarriers in multicast/broadcast service areas B and C, respectively, the data subcarriers being arranged at positions corresponding to those of pilot subcarriers in multicast/broadcast service area A. There is no correlation between phases of d1* and d2*. Therefore, if d1* and d2* are opposite in phase and attenuate each other, the level of interference between their corresponding subcarrier groups is low. If d1* and d2* are in the same phase and strengthen each other, the level of interference between their corresponding subcarrier groups is high. However, since transmission data are scattered over a plurality of subcarrier groups, high overall performance is achieved. Additionally, since the power of data channel signals is generally set to be lower than the power of pilot channel signals, even when the data channel signals strengthen each other, it is possible to improve performance of channel response estimation as compared to the case of the conventional technique described above. The first and second methods described above may be combined where appropriate. In this case, pilot channel signals in a subcarrier group are multiplied by a different orthogonal code for each of adjacent multicast/broadcast service areas, while, at the same time, positions of pilot subcarriers are changed for each of the adjacent multicast/broadcast service areas.

Hereinafter, the embodiments using the above-described concept of the present invention will be described.

Figure 4:
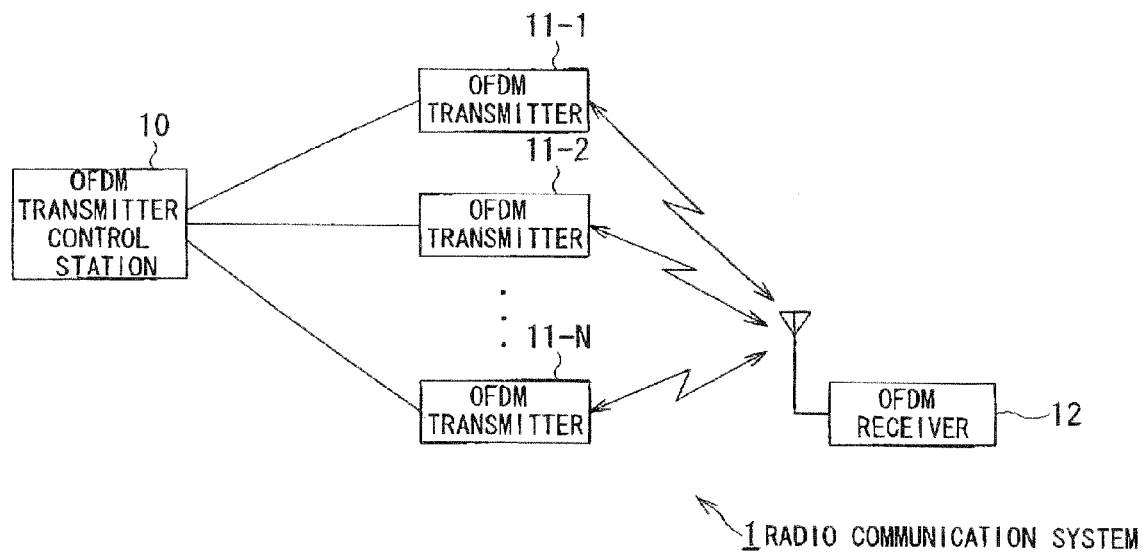
FIG. 4 illustrates a schematic configuration of a radio communication system according to an embodiment of the present invention.

FIG. 4 illustrates a schematic configuration of a radio communication system 1 according to an embodiment of the present invention. As illustrated in FIG. 4, the radio communication system 1 includes an OFDM transmitter control station 10, a plurality (N) of OFDM transmitters 11-1, 11-2, . . . , and 11-N, and an OFDM receiver 12 capable of receiving OFDM signals transmitted from the OFDM transmitters 11-1 to 11-N through different channels (propagation paths). The OFDM transmitters 11-1 to 11-N each transmit an OFDM signal to the OFDM receiver 12. It is not always necessary that all the OFDM transmitters 11-1 to 11-N be located in different places, and some of the OFDM transmitters 11-1 to 11-N may be located in the same place. For example, two of the OFDM transmitters 11-1 to 11-N may be included in one radio communication apparatus. In such a case, since components, such as a subcarrier assignment unit and a subcarrier group setting unit (described below), of the OFDM transmitters 11-1 to 11-N are common to all the OFDM transmitters 11-1 to 11-N, these components may be shared by some of the OFDM transmitters 11-1 to 11-N.

If one or more of the OFDM transmitters 11-1 to 11-N operate together for power control, the OFDM transmitter control station 10 controls the operation of each of the one or more of the OFDM transmitters 11-1 to 11-N.

The OFDM transmitters 11-1 to 11-N illustrated in FIG. 4 each serve as a "base stations" in a cellular system (cellular phone system). The OFDM receiver 12 illustrated in FIG. 4 serves as a "mobile station MS". Hereinafter, if it is not necessary to make distinctions among the OFDM transmitters 11-1 to 11-N, they will be collectively referred to as OFDM transmitters 11. To specifically discuss a multicast/broadcast service in the embodiments of the present invention, the OFDM transmitter control station 10 will be referred to as an "MBS control station", unless otherwise stated.

An MBS control station serving as the OFDM transmitter control station 10 is capable of providing not only one multicast/broadcast service area (i.e., a group of base stations supporting the same MBS), but a plurality of different multicast/broadcast service areas.

Figure 5:
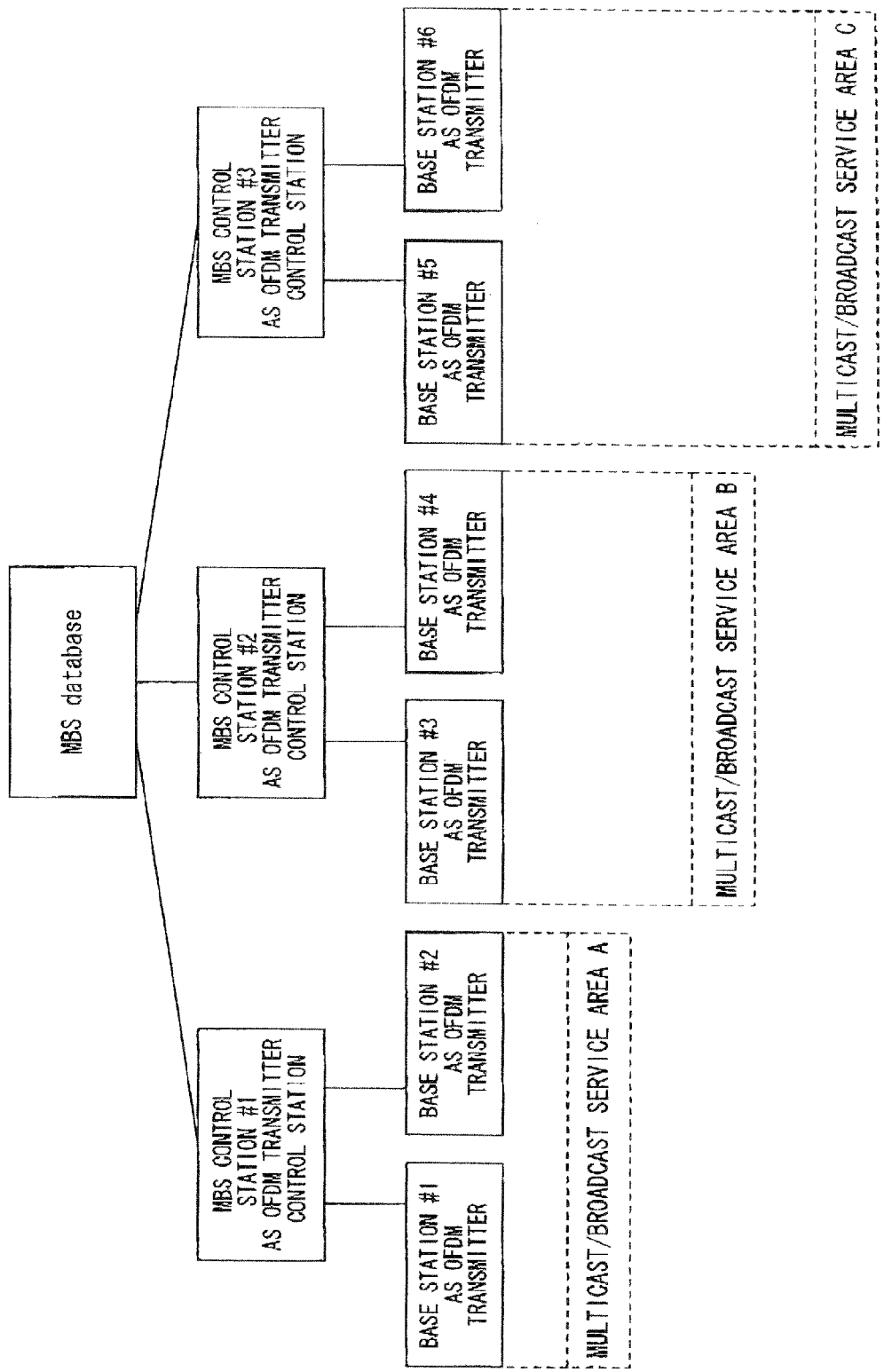
FIG. 5 illustrates an example of a configuration of a network system including an MBS database, MBS control stations serving as OFDM transmitter control stations, and base stations serving as OFDM transmitters.
Figure 6:
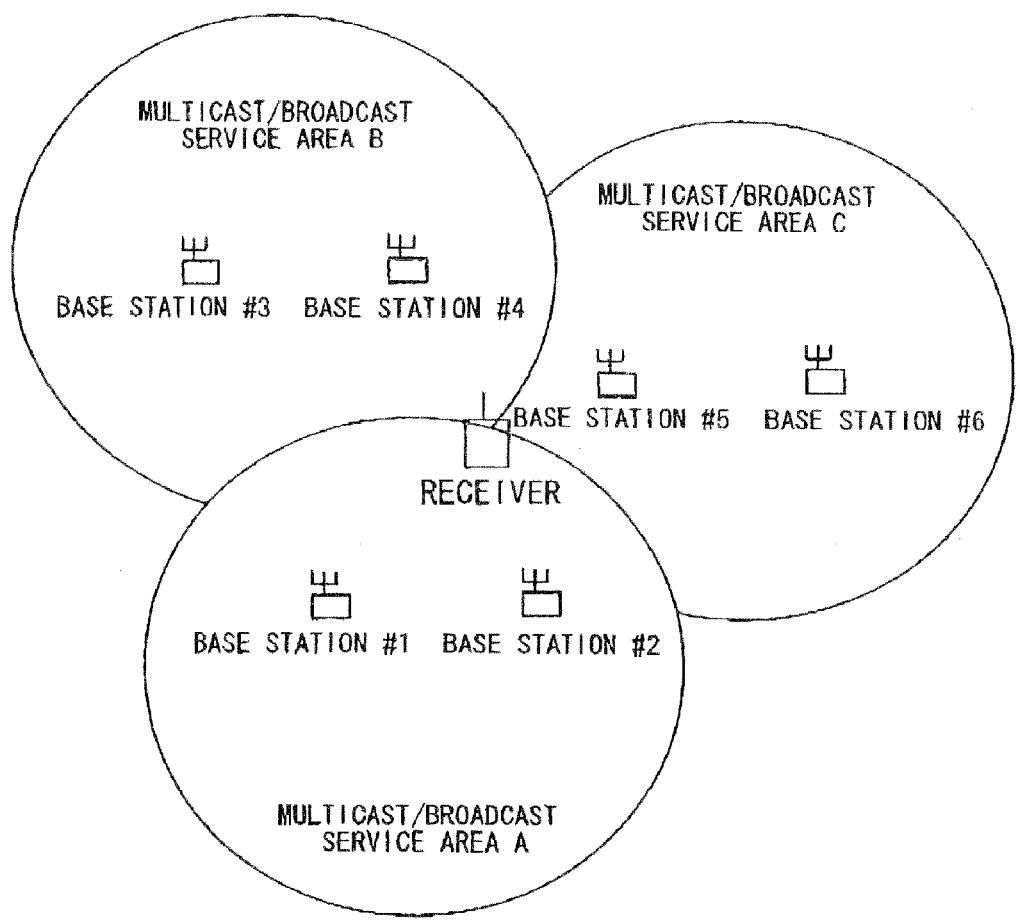
FIG. 6 illustrates a geographical arrangement of multicast/broadcast service areas in the network system illustrated in FIG. 5.

FIG. 5 illustrates an example of a configuration of a network system including an MBS database, MBS control stations each serving as the OFDM transmitter control station 10, and base stations serving as the OFDM transmitters 11. FIG. 6 illustrates a geographical arrangement of multicast/broadcast service areas in the network system illustrated in FIG. 5. For example, in the case of FIG. 5 and FIG. 6, multicast/broadcast service area A covers cell areas of base stations #1 and #2 serving as the OFDM transmitters 11. Likewise, multicast/broadcast service area B covers cell areas of base stations #3 and #4 serving as the OFDM transmitters 11, and multicast/broadcast service area C covers cell areas of base stations #5 and #6 serving as the OFDM transmitters 11.

In this case, an object of the present invention is to reduce the effect of interference of pilot channel signals from multicast/broadcast service areas B and C on a mobile station MS (OFDM receiver) that is located in a cell area of base station #2 in multicast/broadcast service area A and is geographically close to multicast/broadcast service areas B and C.

In FIG. 5 and FIG. 6, to simplify explanation, the number of base stations controlled by one MBS control station is two. However, this number is not limited to two. That is, one MBS control station may control three or more base stations.

Figure 7:
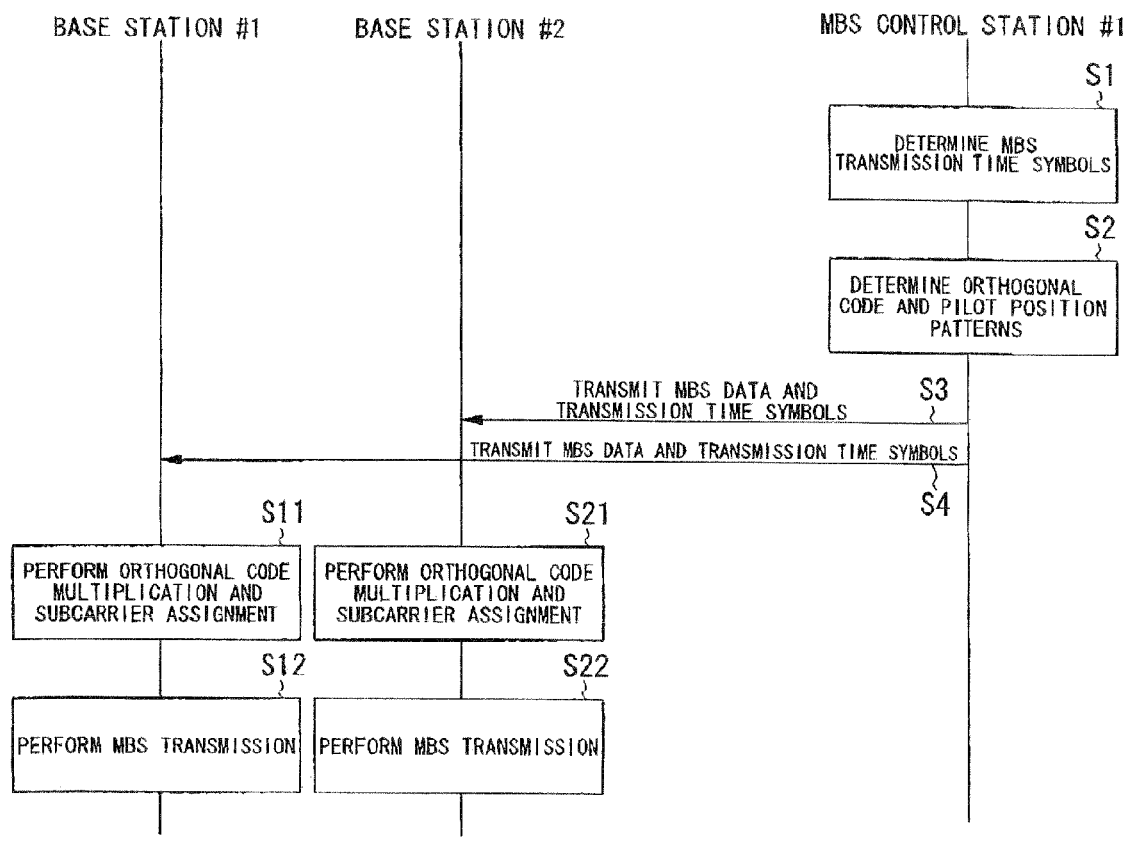
FIG. 7 illustrates a process flow between an MBS control station serving as an OFDM transmitter control station and base stations #k serving as OFDM transmitters and controlled by the MBS control station.

FIG. 7 illustrates a process flow between MBS control station #1 serving as the OFDM transmitter control station 10 and base stations #k serving as the OFDM transmitters 11 and controlled by MBS control station #1.

As illustrated in FIG. 7, in step S1, upon completion of preparation of MBS transmission data, MBS control station #1 schedules and determines MBS transmission time symbols. Additionally, MBS control station #1 schedules a modulation method and a coding rate used in MBS transmission. In step S2, MBS control station #1 selects and determines the patterns of orthogonal codes and positions of pilot channel signals different from those used in multicast/broadcast service areas adjacent to base stations #1 and #2 controlled by MBS control station #1.

In steps S3 and S4, MBS control station #1 notifies each of base stations #1 and #2 of the MBS transmission time symbols determined in step S1. At the same time, MBS control station #1 transmits MBS data to each of base stations #1 and #2. Additionally, MBS control station #1 transmits the selected patterns of an orthogonal code and positions of pilot channel signals to each of base stations #1 and #2. Alternatively, fixed patterns of an orthogonal code and positions of pilot channel signals, the fixed patterns being assigned to each multicast/broadcast service area in advance, may be used. This can eliminate the need of notifying each of base stations #1 and #2 of the above-described information and simplify the control procedure of MBS control station #1.

In step S11, base station #1 codes and modulates the transmission data at the coding rate and by the modulation method provided by MBS control station #1. Additionally, base station #1 multiplies the pilot channel signals by the orthogonal code specified by MBS control station #1, and assigns data channel signals and the pilot channel signals to subcarriers in accordance with the specified pattern of positions of the pilot channel signals. Then, in step S12, base station #1 transmits the transmission data at timing of the determined transmission time symbols. Base station #2 performs operations in step S21 and step S22, which are the same as those in step S11 and step S12.

Figure 8:
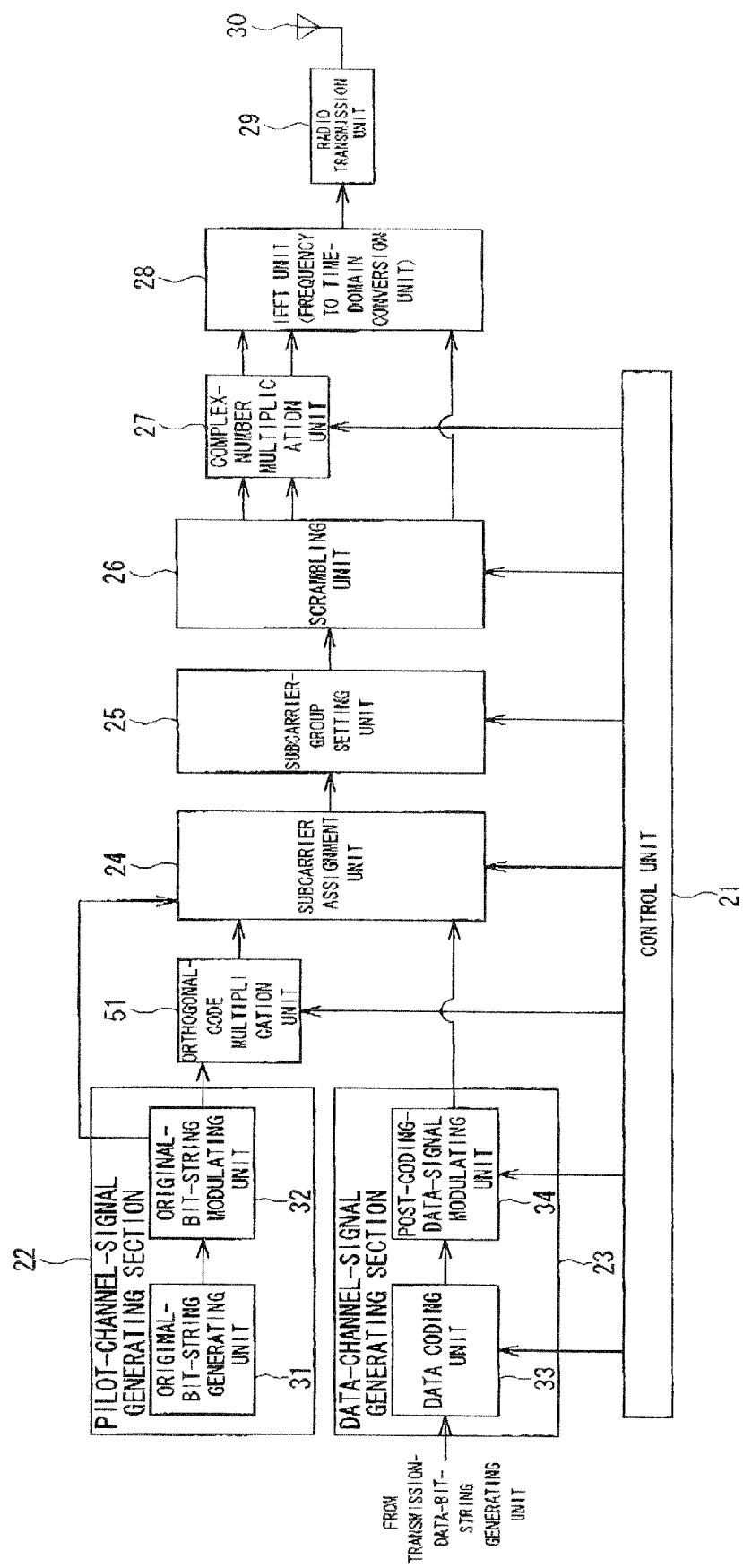
FIG. 8 is a block diagram illustrating an internal configuration of an OFDM transmitter illustrated in FIG. 4.

FIG. 8 illustrates an internal configuration of an OFDM transmitter 11 illustrated in FIG. 4. As illustrated in FIG. 8, the OFDM transmitter 11 includes a control unit 21, a pilot-channel-signal generating section 22, a data-channel-signal generating section 23, an orthogonal-code-pattern multiplication unit 51, a subcarrier assignment unit 24, a subcarrier-group setting unit 25, a scrambling unit 26, a complex-number multiplication unit 27, an IFFT unit (inverse fast Fourier transform unit or frequency to time-domain conversion unit) 28, a radio transmission unit 29, and an antenna 30.

The control unit 21 performs overall control of the OFDM transmitter 11, and controls the pilot-channel-signal generating section 22, the data-channel-signal generating section 23, the subcarrier assignment unit 24, the subcarrier-group setting unit 25, the scrambling unit 26, the complex-number multiplication unit 27, and the IFFT unit 28. The pilot-channel-signal generating section 22 includes an original-bit-string generating unit 31 and an original-bit-string modulating unit 32. The original-bit-string generating unit 31 generates an original bit string of which pilot channel signals are to be formed, and outputs the generated original bit string to the original-bit-string modulating unit 32. The original-bitstring modulating unit 32 applies digital modulation, such as orthogonal phase shift keying (QPSK), to the original bit string from the original-bit-string generating unit 31 so as to generate pilot channel signals.

The data-channel-signal generating section 23 includes a data coding unit 33 and a post-coding-data-signal modulating unit 34. At a channel coding rate specified by the control unit 21, the data coding unit 33 applies channel coding to a transmission data bit string (down-transmission data bit string) generated by a transmission-data-bit-string generating unit (not shown). Then, the data coding unit 33 outputs the resulting post-coding data signal to the post-coding-data-signal modulating unit 31. By a modulation method specified by the control unit 21, the post-coding-data-signal modulating unit 34 applies digital modulation, such as orthogonal phase shift keying (QPSK), to the post-coding data signal so as to generate transmission data channel signals.

The pilot channel signals generated by the pilot-channel-signal generating section 22 and the data channel signals generated by the data-channel-signal generating section, 23 can both be represented by complex numbers. The pilot channel signals are used, for example, for channel estimation (estimation of channel response) in the OFDM receiver 12. The pilot channel signals may also be used for timing synchronization or frequency synchronization in the OFDM receiver 12. In the following embodiment, the pilot channel signals are used for channel estimation in the OFDM receiver 12.

Of the pilot channel signals generated by the pilot-channel-signal generating section 22, those arranged in each subcarrier group set by the subcarrier-group setting unit 25 are multiplied, by an orthogonal code specified by the control unit 21, by the orthogonal-code-pattern multiplication unit 51 in accordance with control of the control unit 21. When the first method described above is not used and only the second method, which involves change of arrangement of pilot channel signals, is used, the orthogonal-code-pattern multiplication unit 51 does not perform the multiplication described above. In this case, the pilot channel signals generated by the pilot-channel-signal generating section 22 are directly input to the subcarrier assignment unit 24.

The subcarrier assignment unit 24 assigns the pilot channel signals from the pilot-channel-signal generating section 22 and the data channel signals from the data-channel-signal generating section 23 to their corresponding subcarriers, that is, to pilot subcarriers and data subcarriers, respectively. The arrangement of the pilot channel signals, that is, a determination as to which pilot channel signal is to be assigned to which subcarrier is made in accordance with the arrangement pattern specified by the control unit 21. As described above, this arrangement pattern is notified to the OFDM transmitter 11 from the MBS control station serving as the OFDM transmitter control station 10 Here, the expression "assigning a signal to a subcarrier" refers to an operation in which, to a signal represented by a complex number, a subcarrier index indicating the position of the corresponding subcarrier on the time and frequency axes is added. A more specific assignment method will now be described with reference to FIG. 9.

Figure 9:
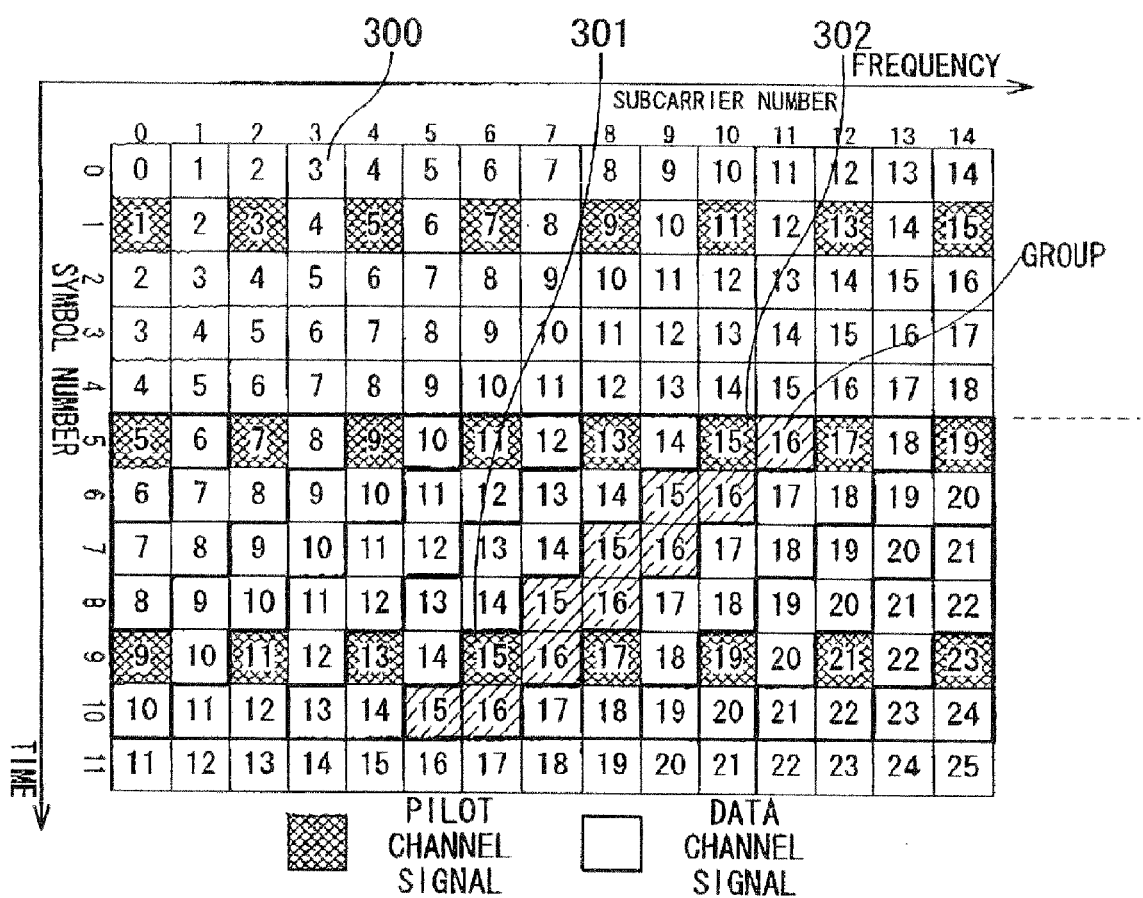
FIG. 9 illustrates how a subcarrier assignment unit of FIG. 8 performs subcarrier assignment and how a subcarrier-group setting unit of FIG. 8 sets subcarrier groups.

FIG. 9 illustrates how the subcarrier assignment unit 24 performs subcarrier assignment and how the subcarrier-group setting unit 25 sets subcarrier groups. As illustrated in FIG. 9, OFDM symbols are arranged along the vertical time axis, and a plurality of subcarriers forming the respective OFDM symbols are arranged along the horizontal frequency axis. The numbers 0, 1, 2, etc. along the time axis are OFDM symbol numbers. The numbers 0, 1, 2, etc. along the frequency axis are subcarrier numbers.

For example, a subcarrier index (3,0) is added to a data channel signal 300 shown in FIG. 9. The pilot channel signals and the data channel signals assigned to the pilot subcarriers and the data subcarriers, respectively, are output from the subcarrier assignment unit 24 to the subcarrier-group setting unit 25.

As illustrated in FIG. 9, the embodiments of the present invention are based on the precondition that, to randomize transmission signals from each OFDM transmitter 11, subcarriers are multiplied by scrambling codes which are shifted by one index for each symbol. That is, one subcarrier and another subcarrier that is shifted leftward by N subcarriers after N symbols are multiplied by a scrambling code of the same complex number.

The subcarrier-group setting unit 25 sets at least one subcarrier group including at least one pilot subcarrier to which a pilot channel signal is assigned and at least one data subcarrier to which a data channel signal is assigned. The at least one subcarrier group is formed by grouping subcarriers such that those by which the same scrambling code is multiplied belong to the same group. In the example of FIG. 9, a plurality of areas, each being surrounded by a black border, are subcarrier groups set by the subcarrier-group setting unit 25. The expression "setting a subcarrier group" refers to adding an index (group index) to a pilot channel signal and a data channel signal to which subcarrier indexes have been added. No group index is added to a signal which does not belong to any subcarrier group.

In a subcarrier group (indicated by diagonal shading in FIG. 9) including pilot subcarriers to which pilot channel signals 301 and 302 multiplied by the same scrambling code "15" are assigned, subcarriers other than these pilot subcarriers are data subcarriers to which data channel signals are assigned.

A signal for which a subcarrier group is set by the subcarrier-group setting unit 25, that is, a data channel signal to which a group index is added is defined as a "first data channel signal". A signal for which no subcarrier group is set, that is, a data channel signal to which no group index is added is defined as a "second data channel signal".

The subcarrier group setting units 25 of the respective OFDM transmitters 11-1 to 11-N illustrated in FIG. 4 set at least one subcarrier group common to the OFDM transmitters 11-1 to 11-N. That is, at least one of subcarrier groups set by the subcarrier group setting units 25 of the respective OFDM transmitters 11-1 to 11-N is common to the OFDM transmitters 11-1 to 11-N. In the common subcarrier group, a pilot channel signal and a data channel signal common to the OFDM transmitters 11-1 to 11-N are assign to a pilot subcarrier and a data subcarrier, respectively. That is, a first data channel signal may be interpreted as a macro diversity signal to which macro diversity reception is applied, and a second data channel signal may be interpreted as a non-macro diversity signal to which macro diversity reception is not applied.

The scrambling unit 26 multiplies a second data channel signal by a predetermined scrambling code unique to the OFDM transmitter 11 and orthogonal or near-orthogonal among the OFDM transmitters 11. On the other hand, the scrambling unit 26 multiplies a pilot channel signal and a first data channel signal by a scrambling code common to the OFDM transmitters 11 in which the same subcarrier group is set. A purpose of scrambling is to randomize modulated data symbols and pilot symbols between adjacent OFDM transmitters 11 or in a group of OFDM transmitters 11 which perform macro diversity communication. Pilot channel signals in a subcarrier group are multiplied by scrambling codes having the same phase.

The scrambling unit 26 outputs, to the complex-number multiplication unit 27, pilot channel signals and first data channel signals to which group indexes are added. At the same time, the scrambling unit 26 outputs scrambled second data channel signals directly to the IFFT unit 28 serving as an OFDM modulator. For the pilot channel signals and first data channel signals to which group indexes are added, the complex-number multiplication unit 27 multiplies each group of pilot channel signals and data channel signals having the same group index by a predetermined complex number unique to each OFDM transmitter 11. Complex numbers determined for respective subcarrier groups may all have the same absolute value, so that it is possible to avoid the occurrence of power differences among the subcarrier groups. A complex number contains a real part and may be a real number, such as ±1. The complex-number multiplication unit 27 outputs the pilot channel signals and data channel signals multiplied by the complex numbers to the IFFT unit 28.

The IFFT unit 28 OFDM-modulates the signals from the scrambling unit 26 and the complex-number multiplication unit 27 to generate an OFDM signal which is a sequence of a plurality of OFDM symbols. That is, the IFFT unit 28 generates an OFDM signal by converting signals in the frequency domain into those in the time domain. Then, a guard interval (GI) adding unit adds a GI to the OFDM signal generated by the IFFT unit 28. The resulting OFDM signal is converted into a radio signal (RF signal) by the radio transmission unit 29 including a digital-to-analog converter, an up-converter, and a power amplifier, and is transmitted from the antenna 30.

Figure 10:
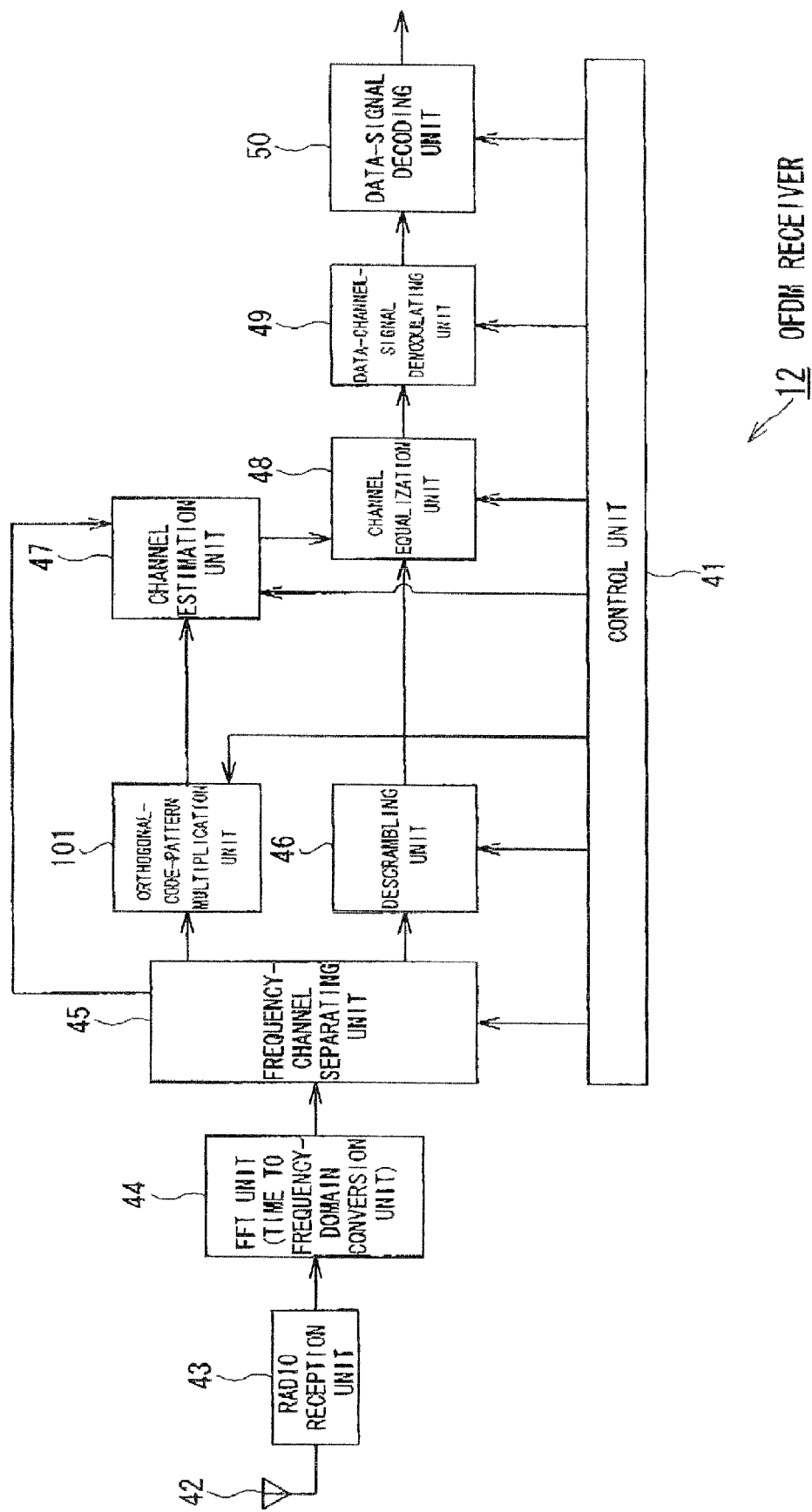
FIG. 10 is a block diagram illustrating an internal configuration of an OFDM receiver illustrated in FIG. 4.

FIG. 10 illustrates an internal configuration of the OFDM receiver 12 illustrated in FIG. 4. FIG. 10 illustrates a configuration related to macro diversity reception and unicast reception of the OFDM receiver 12. As illustrated in FIG. 10, the OFDM receiver 12 includes a control unit 41, an antenna 42, a radio reception unit 43, an FFT unit (fast Fourier transform unit or time to frequency-domain conversion unit) 44, a frequency-channel separating unit 45, an orthogonal-code-pattern multiplication unit 101, a descrambling unit 46, a channel estimation unit 47, a channel equalization unit 48, a data-channel-signal demodulating unit 49, and a data-signal decoding unit 50.

The control unit 41 performs overall control of the OFDM receiver 12, and controls the frequency-channel separating unit 45, the orthogonal-code-pattern multiplication unit 101, the descrambling unit 46, the channel estimation unit 47, the channel equalization unit 48, the data-channel-signal demodulating unit 49, and the data-signal decoding unit 50.

A radio signal received by the antenna 42 is converted into a baseband digital signal by the radio reception unit 43 including a low-noise amplifier, a down-converter, and an analog-to-digital converter. After a guard interval is removed from the baseband digital signal by a GI removing unit, the baseband digital signal in the time domain is divided by the FFT unit 44 into signals in the frequency domain, that is, into signals for respective subcarriers. The FFT unit 44 outputs the signals for the respective subcarriers to the frequency-channel separating unit 45. The frequency-channel separating unit 45 separates pilot channel signals and data channel signals that are assigned to their corresponding subcarriers in a subcarrier group. The frequency-channel separating unit 45 is notified by the control unit 41 of the positions of the subcarriers to which the pilot channel signals and the data channel signals are assigned.

The frequency-channel separating unit 45 outputs the resulting signals (data channel signals) to the descrambling unit 46. The descrambling unit 46 descrambles each of the received signals with a scrambling code sequence (i.e., a scrambling code common to a plurality of OFDM transmitters 11 in which the same subcarrier group is set, or a scrambling code unique to the OFDM transmitter 11) used for multiplication by the OFDM transmitter 11, and outputs the descrambled signals to the channel equalization unit 48. The scrambling code sequence used for multiplication by the OFDM transmitter 11 is one that is known to the OFDM receiver 12. The frequency-channel separating unit 45 outputs the resulting pilot channel signals to the orthogonal-code-pattern multiplication unit 101.

In accordance with control of the control unit 41, the orthogonal-code-pattern multiplication unit 101 multiplies the pilot channel signals by an orthogonal code specified by the control unit 41. When the first method described above is not used and only the second method, which involves change of arrangement of pilot channel signals, is used, the orthogonal-code-pattern multiplication unit 101 does not perform the multiplication described above. In this case, the pilot channel signals are directly input from the frequency-channel separating unit 45 to the channel estimation unit 47.

To perform channel estimation on a first data channel signal, the channel estimation unit 47 averages or interpolates pilot channel signals for each subcarrier group. On the other hand, to perform channel estimation on a second data channel signal, the channel estimation unit 47 averages or interpolates adjacent pilot channel signals. The channel estimation unit 47 outputs a channel estimate indicating a channel response to the channel equalization unit 48. The channel equalization unit 48 uses the channel estimate from the channel estimation unit 47 to perform channel equalization on each data channel signal. After the channel equalization, the data channel signal is demodulated by the data-channel-signal demodulating unit 49. Thus, a bit string of which a data signal is formed is reproduced by the data-signal decoding unit 50.

A communication processing system according to an embodiment of the present invention includes a base station serving as the OFDM transmitter 11 and an MBS control station serving as the OFDM transmitter control station 10 configured to provide a service area including the plurality of OFDM transmitters 11. For every OFDM transmitter 11 included in the same service area, the control station determines time symbols of data to which macro diversity reception is applied, and determines at least one of an orthogonal code by which pilot channel signals are multiplied in transmission of the data in every OFDM transmitter 11 included in the same service area and a pilot arrangement of the pilot channel signals. Then, to all the OFDM transmitters 11 included in the same service area, the control station transmits time symbol information which is information about the determined time symbols, and at least one of the orthogonal code and the pilot arrangement. Each of the OFDM transmitters 11 included in the same service area receives the time symbol information from the control station; receives at least one of the orthogonal code and the pilot arrangement from the control station; performs, on the basis of at least one of the orthogonal code and the pilot arrangement from the control station, at least one of a multiplication using the orthogonal code and an assignment of the pilot channel signals to subcarriers on the basis of the pilot arrangement; sets a subcarrier group; generates an OFDM signal according to time symbols based on the time symbol information; and transmits the generated OFDM signal to the OFDM receiver 12.

Thus, with the first method, it is possible to cancel the effect of interference caused by pilot channel signals in adjacent multicast/broadcast service areas. With the second method, it is possible to prevent pilot channel signals from interfering with each other on a boundary between adjacent multicast/broadcast service areas. Therefore, when a group scrambling method is used, it is possible to suppress interference of pilot channel signals in multicast/broadcast service communication, improve accuracy in channel estimation on a boundary between adjacent multicast/broadcast service areas, and improve reception performance of the OFDM receiver 12. Additionally, combining the first and second methods makes it possible to increase the number of multicast/broadcast service areas arranged adjacent to each other by the number of multiplications performed in the first and second methods. This is particularly effective in environments where a large number of small multicast/broadcast service areas are adjacent to each other.

The present invention is not limited solely to the embodiments described above. In the practical phase, the present invention can be embodied by modifying its components within its scope. It is possible to form various inventions by appropriately combining a plurality of components disclosed in the above embodiments. Some of the components described in the above embodiments may be omitted. Components according to different embodiments of the present invention may be appropriately combined.

The series of processes described in the embodiments of the present invention may be executed either by software or hardware.

The embodiments of the present invention have shown an example where the steps of the flowchart are processed sequentially in the described order. However, the steps of the flowchart do not necessarily need to be processed sequentially, but may be processed simultaneously or individually.

What is claimed is:
1. A communication processing system comprising:
an OFDM transmitter; and
a control station configured to provide a service area including a plurality of OFDM transmitters,
wherein, for every OFDM transmitter included in the same service area, the control station determines time symbols of data to which macro diversity reception is applied, and determines at least one of an orthogonal code by which pilot channel signals are multiplied in transmission of the data in every OFDM transmitter included in the same service area and a pilot arrangement of the pilot channel signals;
the control station transmits, to all the OFDM transmitters included in the same service area, time symbol information about the determined time symbols, and at least one of the orthogonal code and the pilot arrangement; and
each of the OFDM transmitters included in the same service area receives the time symbol information from the control station, receives at least one of the orthogonal code and the pilot arrangement from the control station, performs, on the basis of at least one of the orthogonal code and the pilot arrangement from the control station, at least one of a multiplication using the orthogonal code and an assignment of the pilot channel signals to subcarriers on the basis of the pilot arrangement, sets a subcarrier group, generates an OFDM signal according to time symbols based on the time symbol information, and transmits the generated OFDM signal to an OFDM receiver.
2. An OFDM signal transmitting method of an OFDM transmitter included in a first service area, the OFDM signal transmitting method comprising:
a data channel signal generating step of generating data channel signals including at least one of a first data channel signal and a second data channel signal by modulating a bit string obtained by channel coding;
a pilot channel signal generating step of generating pilot channel signals;
an assigning step of assigning the data channel signals generated in the data channel signal generating step to data subcarriers common to a plurality of OFDM transmitters, and assigning the pilot channel signals generated in the pilot channel signal generating step to pilot subcarriers common to the plurality of OFDM transmitters;
a subcarrier group setting step of setting at least one subcarrier group including a first pilot subcarrier, a second pilot subcarrier multiplied by the same scrambling code as that by which the first pilot subcarrier is multiplied, and one or a plurality of data subcarriers close to the first pilot subcarrier and the second pilot subcarrier in terms of time and frequency and multiplied by the same scrambling code as that by which the first pilot subcarrier and the second pilot subcarrier are multiplied;
an orthogonal code multiplication step of multiplying, of the pilot channel signals generated in the pilot channel signal generating step, pilot channel signals belonging to any subcarrier group set in the subcarrier group setting step by an orthogonal code which differs between the first service area and one or a plurality of other service areas adjacent to the OFDM transmitter included in the first service area;
a scrambling step of multiplying, of the data channel signals, a first data channel signal for which a subcarrier group is set in the subcarrier group setting step and the pilot channel signals multiplied by the orthogonal code in the orthogonal code multiplication step by a scrambling code common to a plurality of OFDM transmitters in which the same subcarrier group is set, and multiplying of the data channel signals, a second data channel signal for which a subcarrier group is not set in the subcarrier group setting step by a predetermined scrambling code orthogonal or near-orthogonal among the OFDM transmitters and unique to each OFDM transmitter;
a complex number multiplication step of multiplying the pilot channel signals and the first data channel signal by a complex number for each subcarrier group;
an OFDM signal generating step of generating, in accordance with time symbols based on time symbol information from a control station that controls a plurality of OFDM transmitters included in the first service area, an OFDM signal by OFDM-modulating the second data channel signal multiplied in the scrambling step by the predetermined scrambling code orthogonal or near-orthogonal among the OFDM transmitters and unique to each OFDM transmitter, and the pilot channel signals and the first data channel signal multiplied by the complex number in the complex number multiplication step; and
a transmitting step of transmitting the OFDM signal generated in the OFDM signal generating step to an OFDM receiver via an antenna.
3. An OFDM signal transmitting method of an OFDM transmitter included in a first service area, the OFDM signal transmitting method comprising:
a data channel signal generating step of generating data channel signals including at least one of a first data channel signal and a second data channel signal by modulating a bit string obtained by channel coding;
a pilot channel signal generating step of generating pilot channel signals;

an assigning step of assigning the data channel signals generated in the data channel signal generating step to data subcarriers common to a plurality of OFDM transmitters, and assigning the pilot channel signals generated in the pilot channel signal generating step to pilot subcarriers common to the plurality of OFDM transmitters and based on a pilot arrangement notified in advance by a control station that controls the OFDM transmitter included in the first service area to all OFDM transmitters included in the first service area;

a subcarrier group setting step of setting at least one subcarrier group including a first pilot subcarrier, a second pilot subcarrier multiplied by the same scrambling code as a scrambling code by which the first pilot subcarrier is multiplied, and one or a plurality of data subcarriers close to the first pilot subcarrier and the second pilot subcarrier in terms of time and frequency and multiplied by the same scrambling code as a scrambling code by which the first pilot subcarrier and the second pilot subcarrier are multiplied;

a scrambling step of multiplying, of the data channel signals, a first data channel signal and pilot channel signals for which a subcarrier group is set in the subcarrier group setting step by a scrambling code common to a plurality of OFDM transmitters in which the same subcarrier group is set, and multiplying, of the data channel signals, a second data channel signal for which a subcarrier group is not set in the subcarrier group setting step by a predetermined scrambling code orthogonal or near-orthogonal among the OFDM transmitters and unique to each OFDM transmitter;

a complex number multiplication step of multiplying the pilot channel signals and the first data channel signal by a complex number for each subcarrier group;

an OFDM signal generating step of generating, in accordance with time symbols based on time symbol information from the control station, an OFDM signal by OFDM-modulating the second data channel signal multiplied in the scrambling step by the predetermined scrambling code orthogonal or near-orthogonal among the OFDM transmitters and unique to each OFDM transmitter, and the pilot channel signals and the first data channel signal multiplied by the complex number in the complex number multiplication step; and a transmitting step of transmitting the OFDM signal generated in the OFDM signal generating step to an OFDM receiver via an antenna.

4. An OFDM transmitter included in a first service area, the OFDM transmitter comprising:

a data channel signal generating unit configured to generate data channel signals including at least one of a first data channel signal and a second data channel signal by modulating a bit string obtained by channel coding;

a pilot channel signal generating unit configured to generate pilot channel signals;

an assigning unit configured to assign the data channel signals generated by the data channel signal generating unit to data subcarriers common to a plurality of OFDM transmitters, and assign the pilot channel signals generated by the pilot channel signal generating unit to pilot subcarriers common to the plurality of OFDM transmitters;

a subcarrier group setting unit configured to set at least one subcarrier group including a first pilot subcarrier, a second pilot subcarrier multiplied by the same scrambling code as a scrambling code by which the first pilot subcarrier is multiplied and one or a plurality of data subcarriers close to the first pilot subcarrier and the second pilot subcarrier in terms of time and frequency and multiplied by the same scrambling code as a scrambling code by which the first pilot subcarrier and the second pilot subcarrier are multiplied;

an orthogonal code multiplication unit configured to multiply of the pilot channel signals generated by the pilot channel signal generating unit, pilot channel signals belonging to any subcarrier group set by the subcarrier group setting unit by an orthogonal code that differs between the first service area and one or a plurality of other service areas adjacent to the OFDM transmitter included in the first service area;

a scrambling unit configured to multiply, of the data channel signals, a first data channel signal for which a subcarrier group is set by the subcarrier group setting unit and the pilot channel signals multiplied by the orthogonal code by the orthogonal code multiplication unit by a scrambling code common to a plurality of OFDM transmitters in which the same subcarrier group is set, and multiply, of the data channel signals, a second data channel signal for which a subcarrier group is not set by the subcarrier group setting unit by a predetermined scrambling code orthogonal or near-orthogonal among the OFDM transmitters and unique to each OFDM transmitter;

a complex number multiplication unit configured to multiply the pilot channel signals and the first data channel signal by a complex number for each subcarrier group;

an OFDM signal generating unit configured to generate, in accordance with time symbols based on time symbol information from a control station that controls a plurality of OFDM transmitters included in the first service area, an OFDM signal by OFDM-modulating the second data channel signal multiplied by the scrambling unit by the predetermined scrambling code orthogonal or near-orthogonal among the OFDM transmitters and unique to each OFDM transmitter, and the pilot channel signals and the first data channel signal multiplied by the complex number by the complex number multiplication unit; and a transmitting unit configured to transmit the OFDM signal generated by the OFDM signal generating unit to an OFDM receiver via an antenna.

5. The OFDM transmitter according to claim 4, wherein the assigning unit assigns the pilot channel signals to pilot subcarriers based on a pilot arrangement notified in advance by the control station to all OFDM transmitters included in the first service area.

6. The OFDM transmitter according to claim 5, wherein the pilot arrangement differs between the first service area and one or a plurality of other service areas adjacent to the OFDM transmitter included on the first service area.

7. The OFDM transmitter according to claim 5, wherein the pilot arrangement is common to all the OFDM transmitters included in the first service area.

8. An OFDM transmitter included in a first service area, the OFDM transmitter comprising:

a data channel signal generating unit configured to generate data channel signals including at least one of a first data channel signal and a second data channel signal by modulating a bit string obtained by channel coding;

a pilot channel signal generating unit configured to generate pilot channel signals;

an assigning unit configured to assign the data channel signals generated by the data channel signal generating unit to data subcarriers common to a plurality of OFDM transmitters, and assign the pilot channel signals generated by the pilot channel signal generating unit to pilot subcarriers common to the plurality of OFDM transmitters and based on a pilot arrangement notified in advance by a control station that controls the OFDM transmitter included in the first service area to all OFDM transmitters included in the first service area;

a subcarrier group setting unit configured to set at least one subcarrier group including a first pilot subcarrier, a second pilot subcarrier multiplied by the same scrambling code as a scrambling code by which the first pilot subcarrier is multiplied, and one or a plurality of data subcarriers close to the first pilot subcarrier and the second pilot subcarrier in terms of time and frequency and multiplied by the same scrambling code as a scrambling code by which the first pilot subcarrier and the second pilot subcarrier are multiplied;

a scrambling unit configured to multiply, of the data channel signals, a first data channel signal and pilot channel signals for which a subcarrier group is set by the subcarrier group setting unit by a scrambling code common to a plurality of OFDM transmitters in which the same subcarrier group is set, and multiply, of the data channel signals, a second data channel signal for which a subcarrier group is not set by the subcarrier group setting unit by a predetermined scrambling code orthogonal or near-orthogonal among the OFDM transmitters and unique to each OFDM transmitter;

a complex number multiplication unit configured to multiply the pilot channel signals and the first data channel signal by a complex number for each subcarrier group;

an OFDM signal generating unit configured to generate, in accordance with time symbols based on time symbol information from the control station, an OFDM signal by OFDM-modulating the second data channel signal multiplied by the scrambling unit by the predetermined scrambling code orthogonal or near-orthogonal among the OFDM transmitters and unique to each OFDM transmitter, and the pilot channel signals and the first data channel signal multiplied by the complex number by the complex number multiplication unit; and a transmitting unit configured to transmit the OFDM signal generated by the OFDM signal generating unit to an OFDM receiver via an antenna.

9. The OFDM transmitter according to claim 8, further comprising an orthogonal code multiplication unit configured to multiply, of the pilot channel signals generated by the pilot channel signal generating unit, pilot channel signals belonging to any subcarrier group set by the subcarrier group setting unit by an orthogonal code which differs between the first service area and one or a plurality of other service areas adjacent to the OFDM transmitter included in the first service area.

10. The OFDM transmitter according to claim 8, wherein the pilot arrangement differs between the first service area and one or a plurality of other service areas adjacent to the OFDM transmitter included in the first service area.

11. The OFDM transmitter according to claim 8, wherein the pilot arrangement is common to all the OFDM transmitters included in the first service area.

12. An OFDM receiver comprising:
a receiving unit configured to receive an OFDM signal transmitted from an OFDM transmitter included in a first service area;
an OFDM demodulation unit configured to OFDM-demodulate the OFDM signal received by the receiving unit into signals for respective subcarriers;
a separating unit configured to separate, from the signals obtained by the OFDM demodulation unit, pilot channel signals and data channel signals assigned to the respective subcarriers;
a descrambling unit configured to descramble the data channel signals separated by the separating unit with a scrambling code common to a plurality of OFDM transmitters in which the same subcarrier group is set or with a scrambling code unique to each OFDM transmitter;
an orthogonal code multiplication unit configured to multiply the pilot channel signals separated by the separating unit by an orthogonal code that differs between the first service area and one or a plurality of other service areas adjacent to the OFDM transmitter included in the first service area;
a channel estimation unit configured to perform, on the basis of the pilot channel signals multiplied by the orthogonal code by the orthogonal code multiplication unit, channel estimation on the data channel signals separated by the separating unit;
an equalizing unit configured to equalize, by using channel estimates obtained by the channel estimation unit, the data channel signals descrambled by the descrambling unit; and
a data demodulating unit configured to demodulate the data channel signals equalized by the equalizing unit.

13. The OFDM receiver according to claim 12, wherein the pilot channel signals separated by the separating unit are pilot channel signals assigned to pilot subcarriers based on a pilot arrangement notified in advance by a control station which controls the OFDM transmitter included in the first service area to all OFDM transmitters included in the first service area.

14. The OFDM receiver according to claim 13, wherein the pilot arrangement differs between the first service area and one or a plurality of other service areas adjacent to the OFDM transmitter included in the first service area.

15. The OFDM receiver according to claim 13, wherein the pilot arrangement is common to all OFDM transmitters included in the first service area.

16. An OFDM receiver comprising:
a receiving unit configured to receive an OFDM signal transmitted from an OFDM transmitter included in a first service area;
an OFDM demodulation unit configured to OFDM-demodulate the OFDM signal received by the receiving unit into signals for respective subcarriers;
a separating unit configured to separate, from the signals obtained by the OFDM demodulation unit, pilot channel signals assigned to pilot subcarriers based on a pilot arrangement notified in advance by a control station which controls the OFDM transmitter included in the first service area to all OFDM transmitters included in the first service area, and data channel signals assigned to their corresponding subcarriers;
a descrambling unit configured to descramble the data channel signals separated by the separating unit with a scrambling code common to a plurality of OFDM transmitters in which the same subcarrier group is set or with a scrambling code unique to each OFDM transmitter;
a channel estimation unit configured to perform, on the basis of the pilot channel signals separated by the separating unit, channel estimation on the data channel signals separated by the separating unit;

an equalizing unit configured to equalize, by using a channel estimate obtained by the channel estimation unit, the data channel signals descrambled by the descrambling unit; and a data demodulating unit configured to demodulate the data channel signals equalized by the equalizing unit.

17. The OFDM receiver according to claim 16, further comprising an orthogonal code multiplication unit configured to multiply the pilot channel signals separated by the separating unit by an orthogonal code which differs between the first service area and one or a plurality of other service areas adjacent to the OFDM transmitter included in the first service area.

18. A control station that provides a service area including a plurality of OFDM transmitters, the control station comprising:

a determining unit configured to determine, for every OFDM transmitter included in the same service area, time symbols of data to which macro diversity reception is applied, and at least one of an orthogonal code by which pilot channel signals are multiplied in transmission of the data in every OFDM transmitter included in the same service area and a pilot arrangement of the pilot channel signals; and a transmitting unit configured to transmit, to all the OFDM transmitters included in the same service area, information about the time symbols determined by the determining unit and at least one of the orthogonal code and the pilot arrangement.

* * * * *